(12) United States Patent
Ueki et al.

(10) Patent No.: US 6,356,976 B1
(45) Date of Patent: Mar. 12, 2002

(54) LSI SYSTEM CAPABLE OF READING AND WRITING AT HIGH SPEED

(75) Inventors: Hiroshi Ueki; Sakae Itoh, both of Tokyo; Tatsuya Sakai; Masayuki Murakami, both of Kanagawa, all of (JP)

(73) Assignees: International Business Machines Corporation, Armonk, NY (US); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/286,299

(22) Filed: Apr. 6, 1999

(30) Foreign Application Priority Data

Nov. 18, 1998 (JP) ............................................. 10-328328

(51) Int. Cl.[7] ........................... G06F 12/00; G06F 13/28
(52) U.S. Cl. ........................... 711/111; 711/4; 711/154; 711/110; 710/22
(58) Field of Search ............................. 711/4, 111, 112, 711/114, 154, 147, 110; 710/22

(56) References Cited

U.S. PATENT DOCUMENTS

| 5,596,737 | A | * | 1/1997 | Strang, Jr. ............. 395/421.03 |
| 5,603,002 | A | * | 2/1997 | Hashimoto ................. 395/440 |
| 5,610,808 | A | * | 3/1997 | Squires et al. ............. 364/131 |
| 6,226,671 | B1 | * | 7/1998 | Hagersten ...................... 711/1 |
| 5,838,892 | A | * | 11/1998 | Wilson .................. 395/182.04 |
| 6,092,155 | A | * | 7/2000 | Olnowich .................... 711/142 |
| 6,094,728 | A | * | 7/2000 | Ichikawa et al. .............. 714/6 |
| 6,122,122 | A | * | 9/2000 | Yoshida ........................ 360/51 |

FOREIGN PATENT DOCUMENTS

JP 7-84963 3/1995

* cited by examiner

Primary Examiner—Do Hyun Yoo
Assistant Examiner—Kimberly McLean
(74) Attorney, Agent, or Firm—Burns, Doane, Swecker & Mathis, LLP

(57) ABSTRACT

A system LSI has a MPU and a HDC (72) in which the HDC (72) incorporates a CIU (721). The CIU (721) decodes addresses transferred from a CPU (73), reads program codes stored in memories such as a ROM (13) and a SRAM (14) in the HDC (72) when the addresses indicate memory fields in the memories, and outputs the obtained program codes to the CPU (73).

6 Claims, 6 Drawing Sheets

LSI SYSTEM CAPABLE OF READING AND WRITING AT HIGH SPEED

BACKGROUND OF THE INVENTION

1. Field of the Invention

The present invention relates to a system Large Scale Integration (a System LSI) formed on a single semiconductor chip, in which a micro processing unit (a MPU) and a control LSI that may operate independently are formed.

2. Description of the Related Art

FIG. 1 is a diagram showing the configuration of a conventional LSI system. In FIG. 1, the reference number 1 designates a MPU having various kinds of units such as a CPU 3, and the reference number 2 denotes a control LSI having various kinds of units such as a data interface circuit, that may operate independently from the operation of the CPU 1. Hereinafter, this control LSI is referred to as a Hard Disk Controller (HDC). The reference number 3 indicates the CPU in the MPU 1, the reference number 4 designates a code interface unit (hereinafter, referred to as a CIU) for reading program codes stored in a Read Only Memory (ROM) 7 or a Static Random Access memory (SRAM) 8, the reference number 5 denotes a ring buffer as a FIFO buffer for storing the program code read from the ROM 7 or the SRAM 8, and the reference number 6 designates a Data Interface Unit (hereinafter referred to as a DIU) for reading data stored in the ROM 7 or the SRAM 8 or a register 9 and for writing data into the ROM 7 or the SRAM 8 or the register 9. The reference numbers 7, 8, and 9 denote the ROM, the SRAM, and the register, respectively. The reference number 10 designates a control Unit for the HDC 2 (hereinafter referred to as a $HDC_{13}$ CU). The reference number 11 denotes a data interface circuit for accessing a ROM 13, a SRAM 14, a register group 15 including a plurality of registers such as a register 15a and a register 15b, and a DRAM 16. The reference number 12 indicates a DRAM controller (hereinafter referred to as a DRAMC) for controlling operation of the DRAM 16. The reference numbers 13, 14, 15, 15a, and 15b designate the ROM, the SRAM, the register group, the register, and the register, respectively. The reference number 16 denotes the DRAM, and the reference number 17 indicates a bus group through which data and control signals are transferred among various kinds of units described above in both the MPU 1 and the HDC 2.

FIGS. 2 and 3 are flow charts each showing the operation of the conventional system LSI shown in FIG. 1.

The description will be given of the operation of the conventional system LSI.

First, a fetch operation of program codes performed by the CPU 3 in the MPU 1 for fetching program codes stored in one of the memories such as the ROM 13 and the SRAM 14 in the HDC 2 will be explained.

The CPU 3 outputs a branch request signal RCLR and a branch address AD_CPU to the CIU 4 when the address of the program is branched. When receiving the branch request signal RCLR and the branch address AD_CPU transferred from the CPU 3, the CIU 4 outputs the branch address AD_CPU to the code address bus C_AD. In addition to this, the CIU 4 outputs a code read-out signal CRE to a bus (see FIG. 4). When the branch address AD_CPU indicates a memory field in the ROM 13 in the HDC 2, for example, the ROM 13 in the HDC 2 outputs a program code corresponding to the address to a code bus CB (See FIG. 4).

Thereby, the CIU 4 may input the program code through the code bus CB, and outputs the program code to the ring buffer 5. The ring buffer 5 stores the program code into an empty field indicated by a pointer of the ring buffer 5. The CIU 4 then increments the pointer indicating the memory field in the ring buffer 5, automatically, and continues the fetch operation to the ROM 13 unless the ring buffer 5 has an empty memory field in which no data item is stored. Hereinafter, the above operation will be referred to as a code pre-fetch operation.

In addition, when receiving the code request signal ROPC transferred from the CPU 3, the CIU 4 outputs program codes stored in the ring buffer 5 to the CPU 3 through a bus OPC_BUS. The CIU 4 performs this operation independently from the pre-fetch operation. Hereinafter the above operation will be referred to as a code output operation. That is, when receiving the code request signal ROPC from the CPU 3, the CIU 4 outputs program codes stored in the ring buffer 5 by the number of predetermined memory fields. This ring buffer 5 is a FIFO memory where a first inserted data item is output first.

When receiving the program codes from the CIU 4, the CPU 3 decodes the program codes received, and then executes instructions obtained by this decoding operation.

Because the CIU 4 may perform the code pre-fetch operation and the code output operation in parallel, the CPU 3 gets the program-codes stored in the memories such as the ROM 13, the SRAM 14 through the ring buffer 5 in the CIU 4 and may execute the instructions generated by the decoding operation for the program codes.

The description will be given of the data read operation by the HDC 2 from the memories such as the ROM 7, the SRAM 8, and the register 9 in the MPU 1.

First, the HDC_CU 10 stores in the register 15a (Step ST1) addresses indicating data fields to be required (In this section, the address to be required indicate memory fields in the register 9 for easy explanation) and data informing that the memory access request signal transferred in the Step ST2 (see FIG. 2) is a data read-out request signal for requesting a data read operation. In this case, it is possible for the CPU 3 to recognize the memory access request transferred from the HDC 2 by the following manner.

That is, the CPU 3 reads data stored in the register 15a at regular time intervals. When the data in the register 15a indicates the memory access request during the periodical data read operation, the CPU 3 recognizes the occurrence of the memory access request.

After Step ST 1, because the HDC 2 can not directly access the memories such as the ROM 7, the SRAM 8, and the register 9 in the MPU 1, the HDC 2, that is, because the HDC 2 has no interface circuit for external memories such as the ROM 7, the SRAM 8, and the register 9 in the MPU 1, the HDC_CU 10 in the HDC 2 generates and outputs the memory access request signal to the CPU 3 (see Step ST2).

When receiving the memory access request signal from the HDC_CU 10, the CPU 3 outputs a data read request signal RDR to the DIU 6, and further an address indicating the register 15a in the HDC 2 onto the bus AD_CPU, simultaneously. (In this case, it is determined in advance that the CPU 3 reads data stored in the register 15a when receiving the memory access request signal.)

When receiving the data read request signal RDR transferred from the CPU 3 and the address indicating the register 15a through the bus AD_CPU, the DIU 6 outputs this address to the data address bus D_AD and a data read-out signal DRE on a bus DRF (see FIG. 5).

When receiving the data read-out signal DRE, the register 15a outputs the data stored therein to a data bus DB (see FIG. 5). This data from the register 15a includes an address indicating the register 9 and information indicating that this memory access request signal is a data read-out request signal.

The DIU 6 gets the data through the data bus DB transferred from the register 15a temporarily (see FIG. 5) and then outputs the data to the CPU 3 through the bus D_BUS. Thereby, the CPU 3 obtains both the data read request from the HDC 3 and the address indicating a target data item to be read. When receiving this target address, the CPU 3 outputs both the data read request signal RDR to the DIU 6 through the bus and the target address indicating the register 9 in the MPU 1 through the bus AD_CPU, simultaneously.

When receiving the data read request signal RDR transferred from the CPU 3 and the target address indicating the register 9 through the bus AD_CPU, the DIU 6 outputs address indicating the target address indicating the register 9 to the data address bus D_AD and the data read-out signal DRE to the bus (see FIG. 5).

When receiving the target address indicating the register 9 and the data read-out signal DRE, the register 9 outputs the data stored therein (and that is the data to be required by the HDC 2) to the data bus DB.

After the register 9 outputs the data, the DIU 6 gets this data through the data bus DB, temporarily (see FIG. 5), and transfer the data to the CPU 3 (see Step ST4).

When getting the data through the data bus D_BUS, the CPU 3 outputs a data write signal RWD to the DIU 6, and also outputs an address indicating the register 15b in the HDC 2 through the bus AD_CPU, simultaneously (In this case, it is designed in advance that the CPU 3 writes the data into the register 15b when reading the data in response to the read request from the HDC 2.).

When receiving the data write request signal RDW from the CPU 3 through the bus and the address indicating the register 15b through the bus AD_CPU, the DIU 6 outputs the address indicating the register 15b to the data address bus D_AD and the data that has been output to the CPU 3 to the data bus DB, and also outputs the data write-in signal DWE, simultaneously (see FIG. 6).

When receiving the address through the data address bus D_AD and the data through the data bus DB and the data write-in signal DWE, the register 15b stores the data therein (Step ST5).

The HDC_CU 10 reads the data stored in the register 15 under the control of the data interface circuit 11. Thus, the HDC_CU 10 obtains the data stored in the register 9 in the MPU 1 (Step ST6).

Hereinafter, the description will be given of the operation to re-write data stored in the memories such as the ROM 7, the SRAM 8, and the register 9 in the MPU 1.

First, the HDC_CU 10 in the HDC 2 stores into the register 15a following data items:
  a data item to be written into the memory;
  an address indicating a target memory (it is assumed that the address indicating the target memory is the address indicating the register 9 for brevity); and
  information indicating that the memory access request signal output in Step ST12 is a data write request signal.

Because the HDC 2 can not directly access the memories in the MPU 1, the HDC_CU 10 in the HDC 2 generates and outputs the memory access request signal to the CPU 3 when the HDC 2 writes data to the memories in the MPU 1 (Step ST12).

When receiving the memory access request signal from the HDC_CU 10, the CPU 3 outputs the data read request signal RDR to the DIU 6, and outputs an address indicating the register 15a in the HDC 2 through the bus AD_CPU, simultaneously. (In this case, it is assumed in advance that the CPU 3 reads the data stored in the register 15a when receiving the memory access request signal.)

When receiving the data read request signal RDR from the CPU 3 and the address indicating the register 15a through the bus AD_CPU, the DIU 6 outputs the address indicating the register 15a to the data address bus D_AD and also outputs the data read-out signal DRE to the bus DRF (see FIG. 5).

Then, when receiving the address indicating the register 15a and the data read-out request signal DRE, the register 15a generates and outputs to the data bus DB following data items:
  the address stored therein indicating the target memory (in this case, that is the address indicating the register 9);
  data informing that this memory access request signal is the data write request signal; and
  data to be written into the register 9 (see FIG. 5).

After the register 15a outputs the data on the data bus DB, the DIU 6 gets the data through the data bus DB (see FIG. 5) and then outputs the data to the CPU 3 through the bus D_BUS.

Thereby, the CPU 3 can get the write request from the HDC 2, the address indicating the target memory to which data will be written, and the write-in data to be written into the register 9 (Step ST13).

When receiving the data, the CPU 3 outputs the address indicating the register 9 in the MPU 1 to the bus AD_CPU, and data write request signal RDW, simultaneously.

When receiving the data write request signal RDW transferred from the CPU 3 and the address indicating the register 9 through the bus AD_CPU, the DIU 6 outputs the address indicating the register 9 to the bus D_AD and the write-in data that has been obtained from the CPU 3 through the bus D_BUS, and outputs the data write-in signal DWE (see FIG. 6).

When receiving the address indicating the register 9 and the write-in data and the data write-in signal DWE, the register 9 gets the write-in data through the data bus DB and stores it therein (step ST14).

Because the conventional system LSI has the configuration and the function described above, for example, when the CPU 3 in the MPU 1 reads program codes stored in the memory such as the ROM 13 in the HDC 2, it must be required for the CPU 3 to read the program codes through the CIU 4 in the MPU 1. Hence, the conventional system LSI has a drawback that the speed of the memory accessing to the memories in the HDC 2 becomes low when comparing that the CPU 3 reads the data stored in the memory in the MPU 1.

The description will be given of the reason for the delay of the memory accessing in the conventional system LSI.

The CIU 4 in the MPU 1 has been optimized to access the memories in the MPU 1 at a high speed rate. On the other hand, the HDC_CU10 in the HDC 2 has been optimized to access the memories in the HDC 2 at the high speed rate. Accordingly, the accessing speed in the former becomes lower than the later:

The CIU 4 in the MPU 1 fetches data stored in the memories in the HDC 2; and the CIU 4 in the MPU 1 fetches data stored in the memories in the MPU 1.

In order to avoid this drawback, it is acceptable for the CIU 4 in the MPU 1 to access data at a high speed rate by re-designing the memories in the HDC 2. However, this method causes a new drawback since it becomes impossible for the HDC_CU 10 in the HDC 2 to access the memories in the HDC 2 at a maximum speed rate. This causes a decrease in the performance of the entire system LSI.

On the other hand, it is also acceptable to change the function of the CIU 4 in the MPU 1 so that the memories in the HDC 2 are accessed at a high speed rate. However, this method causes a drawback since it becomes impossible for the CIU 4 in the MPU 1 to access the memories in the MPU 1 at the maximum speed rate. Accordingly, this also causes a decrease in the performance of the entire of the conventional LSI system.

In addition, the conventional system LSI has another drawback that the CIU 4 in the MPU 1 can not access the dedicated memory such as the DRAM 16 for the HDC 2. The reason for this drawback is that the MPU 1 has no DRAM controller. In order to eliminate the drawback, it is acceptable for the MPU 1 to incorporate a DRAM controller. This causes to increase the area of the semiconductor chip, on which the MPU 1 and the HDC 2 are formed, by the area of the added DRAM controller. Even if the DRAM controller is added in the MPU 1 formed on the semiconductor chip, the former drawback still remains that the accessing speed to the memories incorporated in the different devices becomes low.

In addition, because the conventional system LSI does not incorporate any interface circuit for external memories observed from the HDC 2, it is impossible for the HDC_CU 10 in the HDC 2 to directly access the memories in the MPU 1 when the HDC_CU 10 in the HDC 2 reads data stored in the memories in the MPU 1. Accordingly, the HDC_CU 10 in the HDC 2 generates and outputs the memory access request signal to the CPU 3 in the MPU 1 in order to indirectly read desired data. That is, the CPU 3 reads the desired data through the DIU 6 in the MPU 1 and writes the desired data to the register in the HDC 2 and the HDC_CU 10 then gets the desired data through the register in the HDC 2. This therefore causes that the EDC 2 can not read the desired data stored in the different devices at a high speed rate.

In order to eliminate the drawback involved in the conventional system LSI described above, it is acceptable to incorporate an additional DIU in the HDC 2 in order to read the memory in the MPU 1. However, this method has a drawback that the entire area of the semiconductor chip on which the MPU 1 and the HDC 2 are mounted is increased by the area of the additional DIU. Further, the data write accessing to the memories in the MPU 1 by the HDC 2 has a drawback that it is impossible to write data into the memories in the MPU 1 at a high speed rate because the CPU 3 controls the data write access request transferred from the MPU 1, like the data read accessing described above.

SUMMARY OF THE INVENTION

Accordingly, an object of the present invention is, with due consideration to the drawbacks of the conventional technique, to provide a system LSI capable of reading program codes stored in memories incorporated in a control LSI such as a Hard Disc Controller by a CPU in a MPU at a high speed rate.

In addition, it is another object of the present invention is to provide a system LSI capable of reading data in memories in a MPU by a control LSI at a high speed rate.

Further, it is another object of the present invention is to provide a system LSI capable of writing data in memories in a MPU by a control LSI at a high speed rate.

In accordance with a preferred embodiment of the present invention, a system LSI comprises a MPU and a control LSI. The MPU has a CPU. The control LSI comprises a plurality of memories and a code interface circuit. The code interface circuit receives addresses transferred from the CPU, decodes the addresses, accesses the memories when a decoding result of the addresses indicates memory fields in the memories, reads program codes stored in the memories according to the decoding result of the addresses, and outputs the program codes to the CPU.

In the system LSI as another preferred embodiment of the present invention, the memories includes a DRAM, and the code interface circuit in the control LSI comprises a DRAM control circuit to directly accessing the DRAM.

In the system LSI as another preferred embodiment of the present invention, the code interface circuit comprises a ring buffer to sequentially store the program code that have been read from the memories, and the code interface circuit continues a readout operation of the program codes from the memories unless the ring buffer has empty memory fields.

In accordance with another preferred embodiment of the present invention, a system LSI comprises a MPU having memories, and a control LSI. The MPU comprises a data interface circuit for performing data accessing to the memories when receiving addresses addressing the memories and a data access request signal. The control LSI comprises a control circuit, an access circuit for receiving addresses and an access request signal transferred from the control circuit, for decoding the addresses, and for outputting to the data interface circuit the addresses and the access request signal when a decoding result of the addresses indicates memory fields in the memories in the MPU. In the system LSI, the data interface circuit performs a data access operation to the memories according to the addresses and the access request signal transferred from the access circuit, and then transfers data items as an execution result of the data access operation to the access circuit.

In the system LSI as another preferred embodiment of the present invention, when the control circuit outputs addresses and a data read access request signal as the access request signal, the access circuit receives and decodes the addresses, and outputs the addresses and the data read access request signal to the data interface circuit when a decoding result of the addresses indicates memory fields in the memories. Further, the data interface circuit receives the addresses and the data read access request signal transferred from the access circuit, and reads data items from the memories according to the addresses and the data read access request signal, and then outputs the data items read to the access circuit.

In the system LSI as another preferred embodiment of the present invention, when the control circuit outputs addresses, write-in data to be written, and a data write access request signal as the access request signal, the access circuit receives and decodes the addresses, and outputs the addresses, the write-in data, and the data write access request signal to the data interface circuit when a decoding result of the addresses indicates memory fields in the memories. In addition, the data interface circuit receives the addresses, the write-in data, and the data write access request signal transferred from the access circuit, and writes the write-in data to the memories according to the addresses and the data write access request signal.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 7:
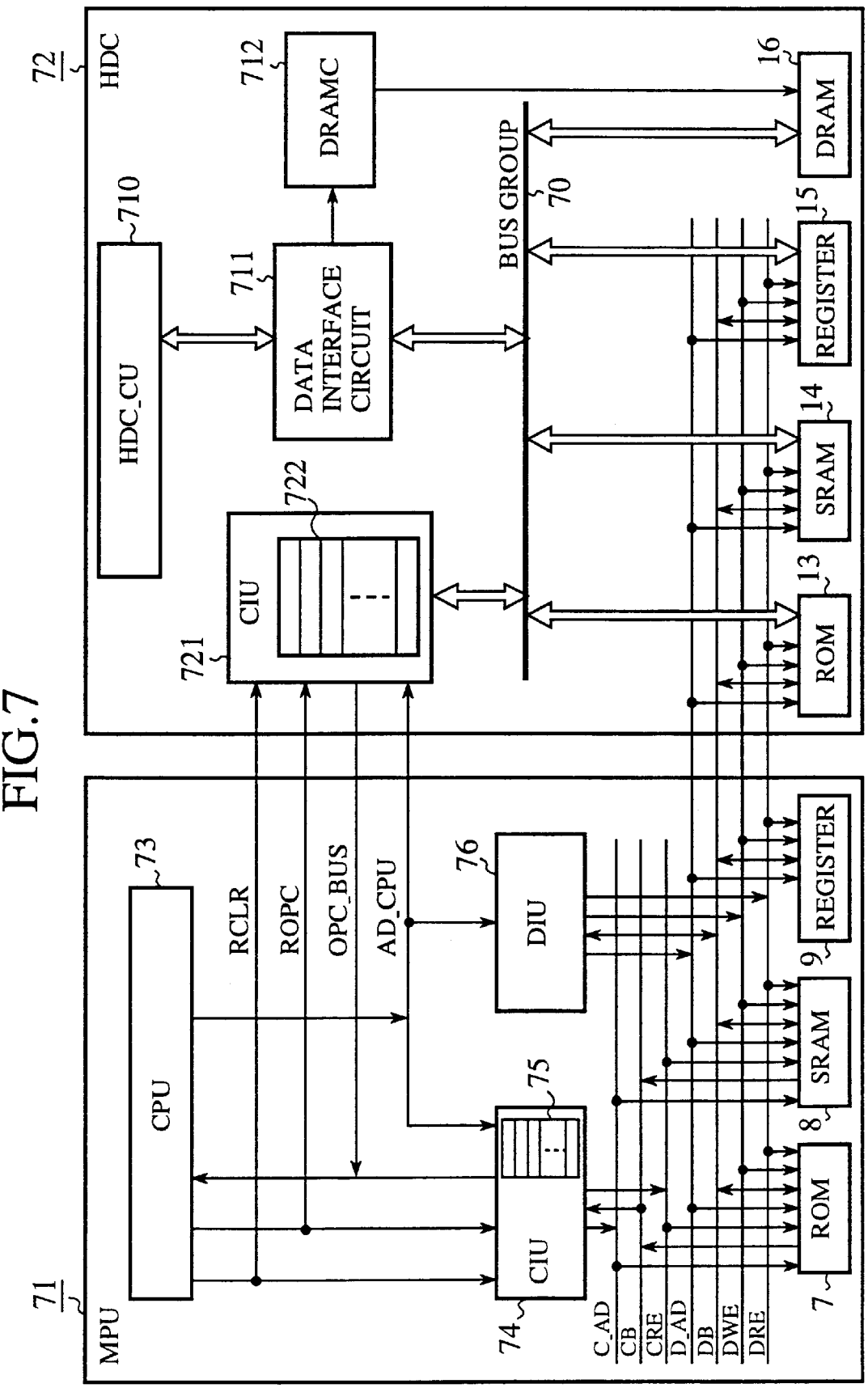
FIG. 7 is a diagram showing the configuration of a system LSI according to the first embodiment of the present invention.

FIG. 7 is a diagram showing the configuration of a system LSI according to the first embodiment of the present invention. In FIG. 7, the reference number 71 designates a MPU incorporating various kinds of units such as a CPU 3, and the reference number 72 denotes a control LSI that can operate independently from the operation of the MPU 71. Hereinafter, this control LSI is referred to as a Hard Disk Controller (HDC). The reference number 73 indicates the CPU in the MPU 71, the reference number 74 designates a code interface unit (hereinafter, referred to as a CIU) for reading program codes stored in a Read Only Memory (ROM) 7 or a Static Random Access memory (SRAM) 8. The reference number 75 denotes a ring buffer as a FIFO memory for storing the program code read from the ROM 7 or the SRAM 8, and the reference number 76 designates a data interface unit (hereinafter referred to as a DIU) for reading data stored in the ROM 7 or the SRAM 8 or a register 9 and for writing data into the ROM 7 or the SRAM 8 or the register 9. The reference numbers 7, 8, and 9 denote the ROM, the SRAM, and the register, respectively. The reference number 710 designates a controller for the HDC 72 (hereinafter referred to as a HDC_CU). The reference number 711 denotes a data interface circuit for accessing a ROM 13, a SRAM 14, a register group or a register 15, and a DRAM 16. The reference number 712 designates a DRAM controller (hereinafter referred to as a DRAMC) for directly controlling the operation of the DRAM 16. The reference numbers 13, 14, 15, and 16 denote the ROM, the SRAM, the register or the register group, and the DRAM, respectively. The reference number 721 designates a code interface unit (hereinafter referred to as a CIU for brevity) for decoding an address transferred from the CPU 73 and for outputting the decoded address to the CPU 73 when this decoded address indicates one of the memory fields in the memories such as the ROM 13 and the SRAM 14 based on the decoding result. The reference number 722 is a ring buffer as a FIFO memory for storing program codes that have been read from the ROM 13 and other memories.

Although the CIU 721 performs basically the same operation of the CIU 74 in the MPU 71, the CIU 721 reads program codes stored in the memories such as the ROM 13, and the SRAM 14 in the HDC 72 and the CIU 74 reads program codes stored in the memories such as the ROM 7 and the SRAM 8 in the MPU 71.

The description will be given of the operation of the system LSI according to the first embodiment of the present invention.

The CPU 73 in the MPU 71 outputs both a branch request signal RCLR and a branch address AD_CPU to each of the CIU 74 and the CIU 721 when the request of the program address branch operation occurs.

When receiving the branch address AD_CPU transferred from the CU 73, each of the CIU 74 and the CIU 721 decodes the branch address AD_CPU and checks whether or not the address decoded indicates the memory to be controlled by itself. If this address indicates one of the memory fields in the memories such as the ROM 7 and the SRAM 8 in the MPU 71, the CIU 74 operates and the CIU 721 does not operate.

On the other hand, If this address indicates one of the memory fields in the memories such as the ROM 13 and the SRAM 14 in the HDC 72, the CIU 721 operates and the CIU 74 does not operate.

The description will be given of the operation of the CIU 721. The CIU 721 outputs a branch address on the bus AD_CPU to an address bus in the bus group 70 in the HDC 72 when the address indicates one of memory field in the memories in the HDC 72, and also outputs a code read-out signal to a bus in the bus group 70 in the HDC 72.

When receiving the code read-out signal from the CIU 721, the ROM 13 or the SRAM 14 in the HDC 72 outputs program codes, that has been stored in the memory fields indicated by the branch addresses obtained through the bus AD_CPU, to a data bus in the bus group 70. When receiving the program codes transferred from the memory such as the ROM 13 or the SRAM 14 in the HDC 72 through the data bus, the CIU 721 stores the program codes received into the ring buffer 722.

In the first embodiment, the program code readout operation by the CIU 721 is the same manner of the program code readout operation by the data interface circuit 711 in the HDC 72. It is thereby possible for the CIU 721 to access the memories such as the ROM 13 and the SRAM 14 in the HDC 72 at an optimum speed.

The CIU 721 increments the value of an address to be transferred to the bus group 70 for the memories, automatically, and continues the fetch operation to the ROM 13 or the SRAM 14 in the HDC 72 unless the ring buffer 5 has an empty memory field in which no data item is stored. Hereinafter the above operation will be referred to as a code pre-fetch operation.

In addition, the CIU 721 continues to supply the program codes to the CPU 73 (hereinafter referred to as a code output operation). The CIU 721 performs this code output operation independently from the code pre-fetch operation.

That is, when receiving the code request signal ROPC from the CPU 73, the CIU 721 sequentially outputs the program codes that stored in the ring buffer 722 by the number of predetermined memory fields. This ring buffer 722 is a FIFO memory in which a first inserted data item is output first.

When receiving the program codes from the CIU 721, the CPU 73 decodes the program codes and then executes instructions based on the program codes decoded.

The CPU 73 can get the program codes stored in the memories such as the ROM 13 and the SRAM 14 in the HDC 72 and execute the instructions continuously at a high speed rate by performing the code pre-fetch operation and the code output operation described above in parallel.

Figure 1:
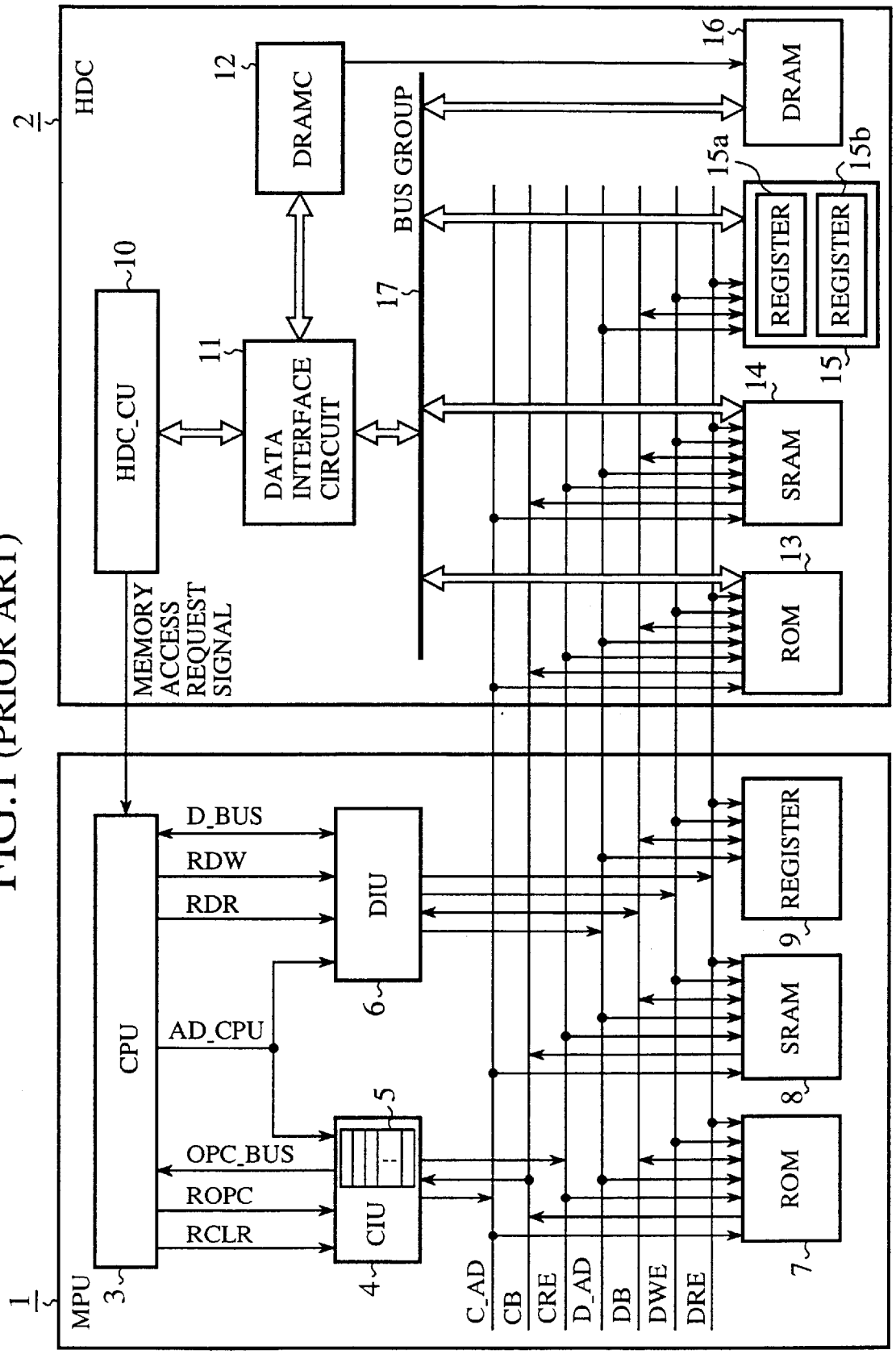
FIG. 1 is a diagram showing the configuration of a conventional system LSI.
Figure 2:
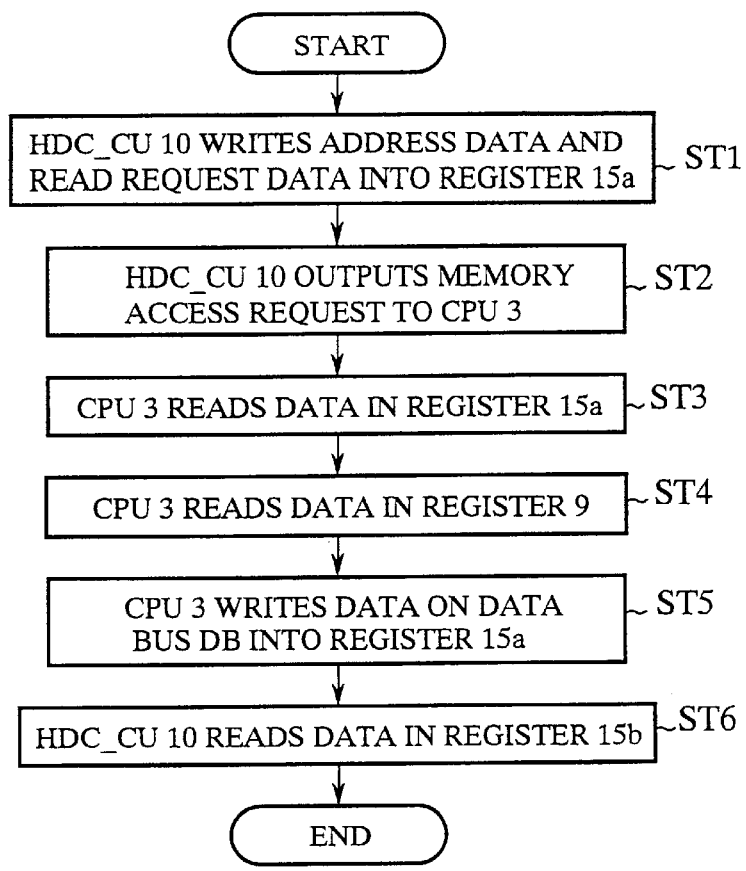
FIG. 2 is a flow chart showing the operation of the conventional system LSI shown in FIG. 1.
Figure 3:
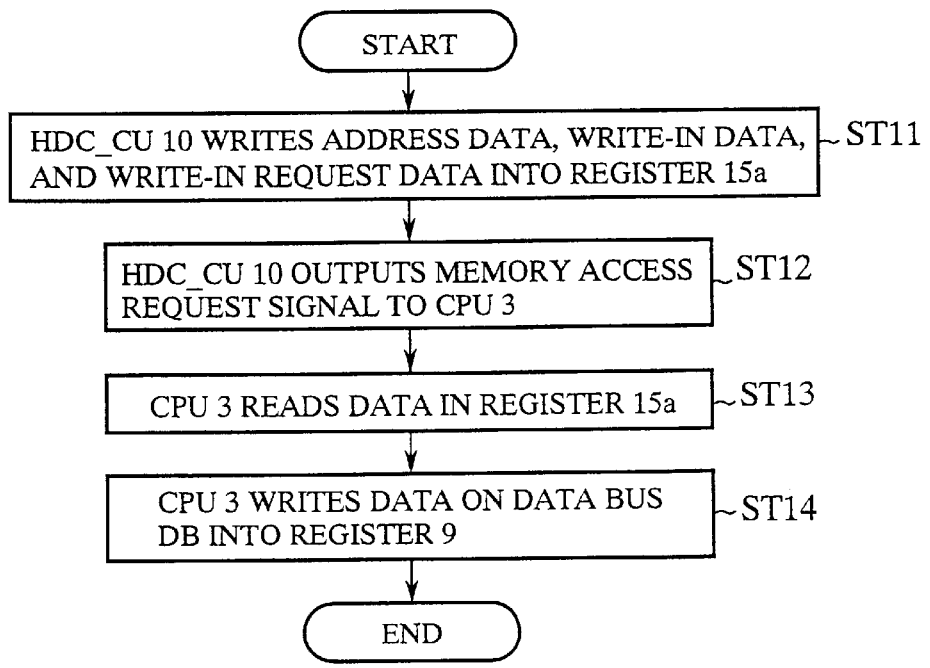
FIG. 3 is a flow chart showing the operation of the conventional system LSI shown in FIG. 1.
Figure 4:
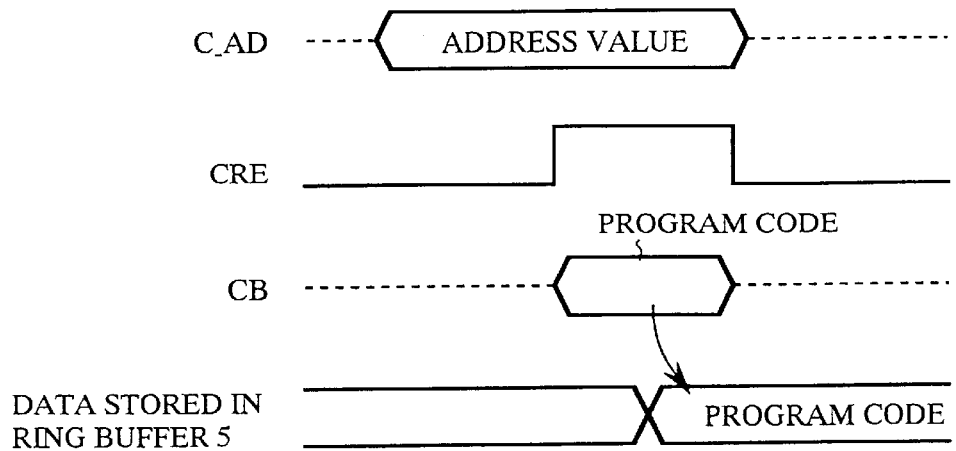
FIG. 4 is a timing chart showing the read-out operation for program codes.

The important configuration and function of the system LSI according to the first embodiment of the present invention are as follows:

When comparing with the program code reading operation performed by the conventional system LSI shown in FIGS. 1 to 3 in which the CPU 3 reads the program codes stored in the memory in the HDC 2 through the CIU 4, the CPU 72 in the MPU 71 in the system LSI according to the first embodiment can read the program codes stored in the memories such as the ROM 13 and the SRAM 14 in the HDC 72 through the CIU 721 that is also incorporated in the HDC 72. The reason for this feature is that the interface method for the CIU 721 to the memories such as the ROM 13 and the SRAM 14 in the HDC 72 is so designed that it becomes equal to the interface method of the data interface circuit 711 in order to increase the accessing speed for the program codes stored in the memories in the HDC 72;

In addition to this feature of the present invention, the interface method to output the program codes from the CIU 721 to the CPU 73 is so designed that it becomes equal in function to the interface method of the CIU 74 in the MPU 71.

As described above, according to the first embodiment of the present invention, because the system LSI is so formed that the HDC 72 incorporates the CIU 721, it is possible for the CPU 73 in the MPU 71 to read program codes stored in the memories in the HDC 72 at a high speed rate when addresses output from the CPU 73 designate the memory fields in the memories in the ROM 13 and the SRAM 14 in the HDC 72 based on a decoding result obtained from the CPU 721.

Second Embodiment

Figure 8:
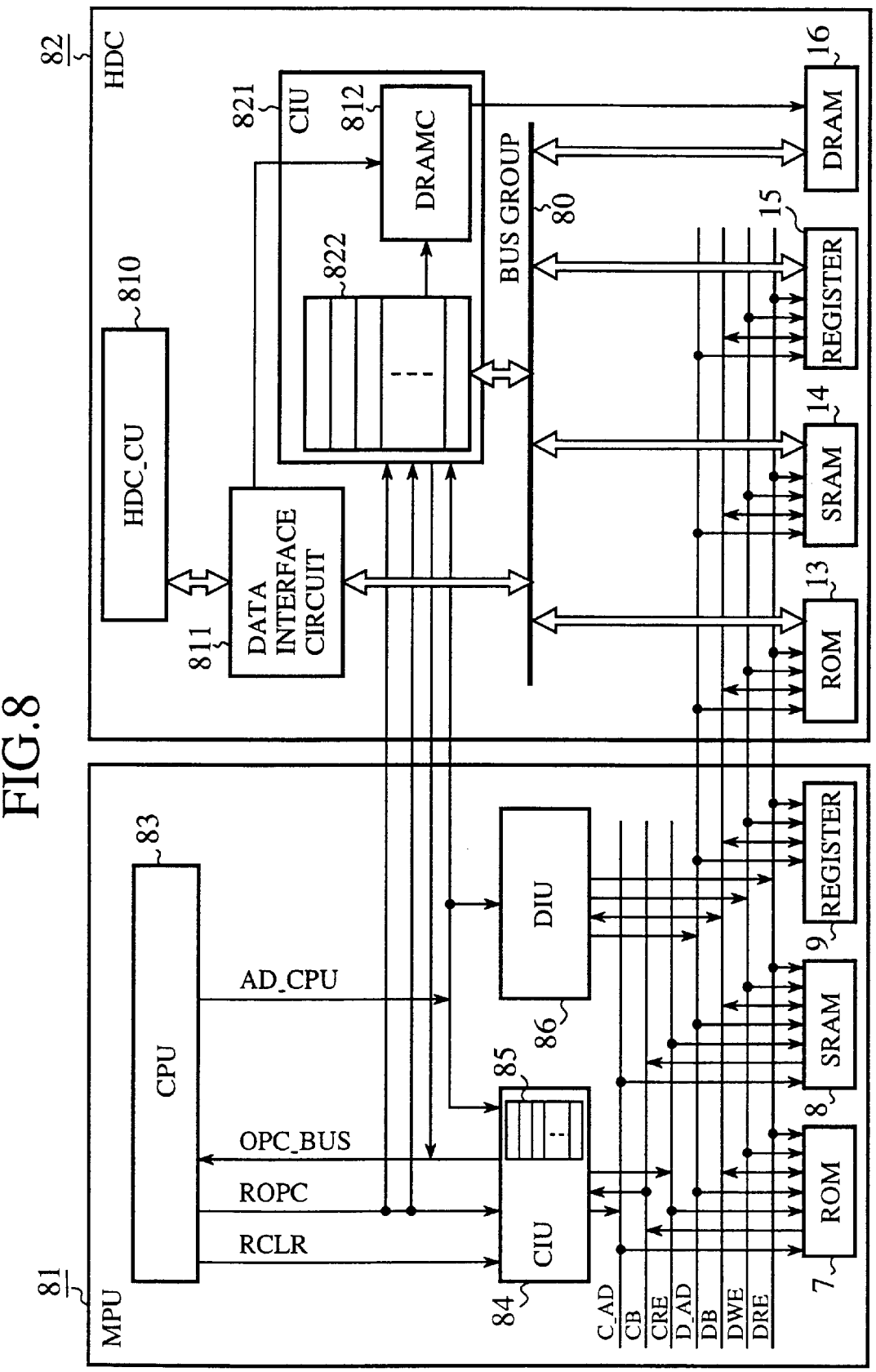
FIG. 8 is a diagram showing the configuration of a system LSI according to the second embodiment of the present invention.

Although the CIU 721 in the HDC 72 in the system LSI of the first embodiment is separated from the DRAMC 712 shown in FIG. 7, it is possible for the CIU to incorporate the DRAM controller DRAMC 821, as shown in FIG. 8.

FIG. 8 is a diagram showing the configuration of a system LSI according to the second embodiment of the present invention. In FIG. 8, the reference number 81 designates a MPU incorporating various kinds of units such as a CPU 83, and the reference number 82 denotes a control LSI that can operate independently from the operation of the MPU 81. Hereinafter, this control LSI is referred to as a Hard Disk Controller (HDC). The reference number 83 indicates the CPU incorporated in the MPU 81, the reference number 84 designates a code interface unit (hereinafter, referred to as a CIU) for reading program codes stored in a Read Only Memory (ROM) 7 or a Static Random Access Memory (SRAM) 8, the reference number 85 denotes a ring buffer as a FIFO memory for storing the program code fetched from the ROM 7 or the SRAM 8, and the reference number 86 designates a data interface unit (hereinafter referred to as a DIU) for fetching data stored in the ROM 7 or the SRAM 8 or a register 9 and for writing data into the ROM 7 or the SRAM 8 or the register 9. The reference numbers 7, 8, and 9 denote the ROM, the SRAM, and the register, respectively. The reference number 810 designates a control unit for the HDC 82 (hereinafter referred to as a HDC_CU). The reference number 811 denotes a data interface circuit for accessing a ROM 13, a SRAM 14, a register group or a register 15, and a DRAM 16. The reference numbers 13, 14, 15, and 16 denote the ROM, the SRAM, the register or the register group, and the DRAM, respectively. The reference number 821 designates a code interface unit (hereinafter referred to as a CIU for brevity) for decoding an address transferred from the CPU 83 and for outputting the decoded address to the CPU 83 when this decoded address indicates one of the memory fields in the memories such as the ROM 13 and the SRAM 14 based on the decoding result. The reference number 822 is a ring buffer as a FIFO buffer for storing program codes that have been fetched from the ROM 13 and other memories in the HDC 82. The reference number 812 designates a DRAM control unit (hereinafter referred to as a DRAMC), incorporated in the CIU 821, capable of directly controlling the operation of the DRAM 16. The reference number 80 denotes a bus group including a plurality of buses connected among the data interface circuit 811, the CIU 821, the ROM 13, the SRAM 14, the register 15, and the DRAM 16. The reference number 80 designates a bus group including an address bus, a data bus, a control bus, and other buses through which the data interface circuit 811, the CIU 821 incorporating the DRAMC 812 and the ring buffer 822, the ROM 13, the SRAM 14, the register 15, and the DRAM are connected. Other components and function of the system LSI as the second embodiment are the same as the components and the function of the system LSI of the first embodiment. Accordingly, the explanation of the same component and the function is omitted here for brevity.

Because the second embodiment has the configuration in which the DRAMC 812 is incorporated in the CIU 821, the CIU 821 can directly control the operation of the DRAMC 812, so that program codes stored in the DRAM 16 are transferred to and stored in the ring buffer 822 at a high speed rate. The data interface circuit 811 also controls the operation of the DAMC 812 through a control line connected between the data interface circuit 811 and the CIU 821.

As described above, according to the second embodiment of the present invention, it is possible to read program codes stored in the DRAM 16 in the HDC 82 at a high speed rate without adding any dedicated circuit in the system LSI.

Third Embodiment

Figure 9:
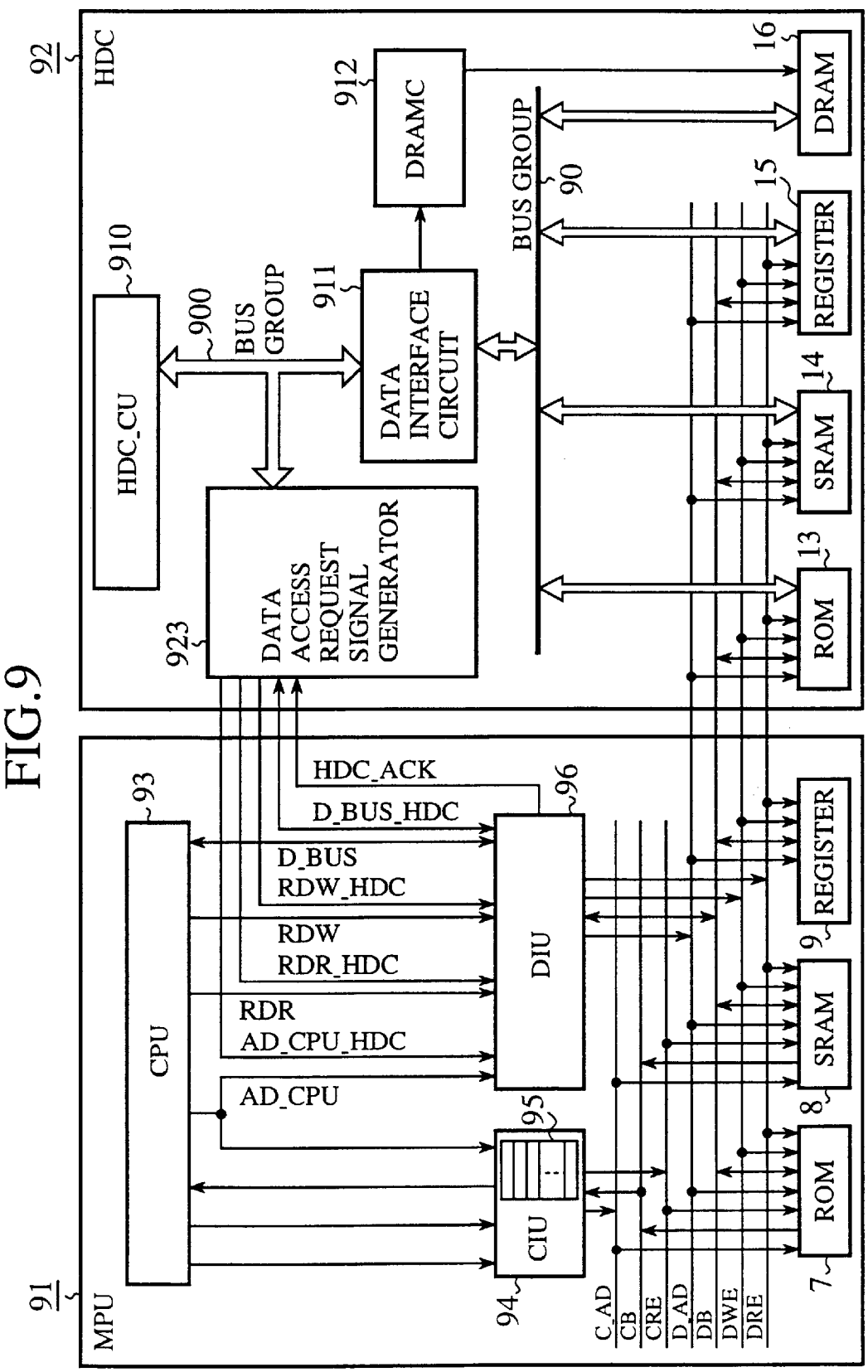
FIG. 9 is a diagram showing the configuration of a system LSI according to the third embodiment of the present invention.

FIG. 9 is a diagram showing the configuration of a system LSI according to the third embodiment of the present invention.

In FIG. 9, the reference number 91 designates a MPU incorporating devices such as a CPU 93, and the reference number 92 denotes a control LSI that can operate independently from the operation of the MPU 91. Hereinafter, this control LSI is referred to as a Hard Disk Controller (HDC). The reference number 93 indicates the CPU incorporated in the MPU 91, the reference number 94 designates a code interface unit (hereinafter, referred to as a CIU) for reading program codes stored in a Read Only Memory (ROM) 7 or a Static Random Access Memory (SRAM) 8, the reference number 95 denotes a ring buffer as a FIFO buffer for storing the program code read from the ROM 7 or the SRAM 8. The reference number 96 designates a data interface unit (hereinafter, referred to as a DIU) for reading data stored in the ROM 7 or the SRAM 8 or a register 9 and for writing data into the ROM 7 or the SRAM 8 or the register 9. The reference numbers 7, 8, and 9 denote the ROM, the SRAM, and the register, respectively. The reference number 910 designates a controller incorporated in the HDC 92

(hereinafter referred to as a HDC_CU). The reference number 911 denotes a data interface circuit for accessing a ROM 13, a SRAM 14, a register group or a register 15, and a DRAM 16. The reference numbers 13, 14, 15, and 16 indicate the ROM, the SRAM, the register or the register group, and the DRAM, respectively. The reference number 90 designates a bus group including an address bus, a data bus, a control bus, and other buses through which the data interface circuit 911, the DRAMC 912, the ROM 13, the SRAM 14, the register 15, and the DRAM are connected. The reference number 923 designates a data access request signal generator as accessing circuit.

First, when the HDC_CU 910 generates and outputs an address and a read request signal (as an access request signal), the data access request signal generator 923 receives and decodes the address. When the address indicates one of the memory fields in the ROM 7, the SRAM 8, and the register 9 in the MPU 91, the data access request signal generator 923 outputs the address and the data read request signal RDR_HDC (as an access request signal) to the DIU 96 in the MPU 91. Then, the data access request signal generator 923 receives data from the DIU 96. In addition, when the HDC_CU 910 outputs an address, a write request signal (as an access request signal), and data, the data access request signal generator 923 receives the address from the HDC_CU 910 and then decodes it. When the address indicates one of the memory fields in the memories such as the ROM 7, the SRAM 8, and the register 9 in the MPU 91 based on the decoding result, the data access request signal generator 923 outputs the address and the data write request signal RDW_HDC (as the access request signal) and a data item to the DIU 96 so that the data item is stored into the memory field in the memories in the MPU 91 designated by the address. The reference number 900 designates a bus group through which the HDC_CU 910 and the data access request signal generator 923 and the data interface circuit 911 are connected. Other components and function of the system LSI as the third embodiment are the same as the components and function of the system LSI of the first and second embodiments. Accordingly, the explanation of the same component and the function is omitted here for brevity.

The description will be given of the operation of the system LSI according to the third embodiment.

The feature of the system LSI as the third embodiment is that the HDC 92 incorporates the data access signal request generator 923. This feature is different from the conventional system LSI. Since the HDC 92 incorporates the data access request signal generator 923, it is possible for the HDC_CU 910 in the HDC 92 to read data stored in and to write data into the memories such as the ROM 7, the SRAM 8, and the register 9 in the MPU 91 through the DIU 96 in the MPU 91.

The description will be given of the data read operation to the data stored in the register 9 in the MPU 91 by the HDC_CU 910 in the HDC 92. The data read operation to the ROM 7, and the SRAM 8 can be executed by the same manner.

First, the HDC_CU 910 in the HDC 92 outputs the address indicating the register 9 in the MPU 91 and the read request signal to the data interface circuit 911 and the data access request signal generator 923 through the bus group 900 connecting the HDC_CU 910, and the data interface circuit 911, and the data access request signal generator 923, where the data format to be used for data transfer operation through the bus group 900 and the timing of data transfer through the bus group 900 are the same as the manner to be used in a normal operation in which the HDC_CU 910 reads data from the memories such as the ROM 13, the SRAM 14, the register 15, and the DRAM 16 in the HDC 92.

When receiving the address indicating the register 9 and the read request signal transferred from the HDC_CU 910, the data access request signal generator 923 decodes the address in order to check whether or not the address indicates a memory field in the memories such as the ROM 7, the SRAM 8, and the register 9 in the MPU 91.

If the address indicates the memory field in one of the memories such as the ROM 7, the SRAM 8, and the register 9 in the MPU 91 as a result of the checking operation of the address by the data access request signal generator 923, the data access signal request signal generator 923 initiates own operation and the data interface circuit 911 continues a halt of its own operation. On the other hand, the address indicates the memory field in the memories such as the ROM 13, SRAM 14, the register 15, and the DRAM 16 in the HDC 92, the data interface circuit 911 starts its own operation and the data access signal generator 923 continues a halt of its own operation.

When receiving the address indicating the register 9 transferred from the HDC_CU 910, the data access request signal generator 923 outputs the address to the address bus AD_CPU_HDC and the data read request signal RDR_HDC to the DIU 96, simultaneously.

Figure 5:
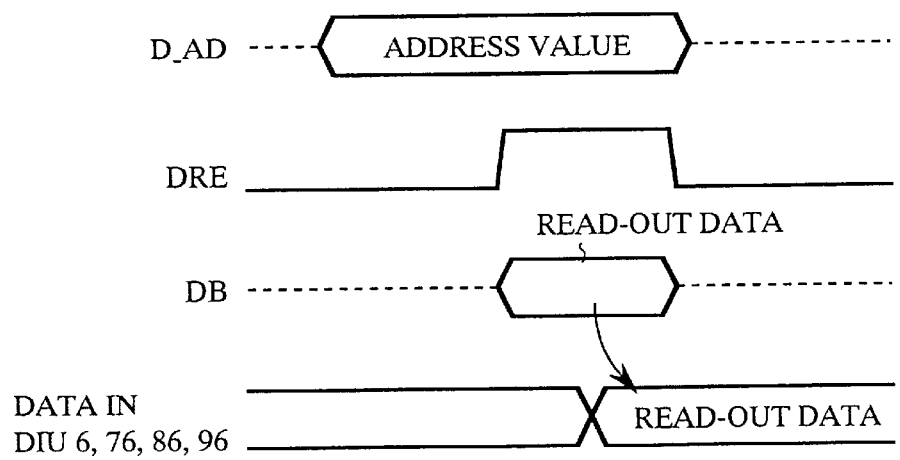
FIG. 5 is a timing chart showing the read-out operation for data.

When receiving the data read request signal RDR_HDC and the address indicating the register 9 transferred from the data access request signal generator 923, the DIU 96 outputs the address indicating the register 9 to the data address bus D_AD and the data read request signal DRE (see FIG. 5) unless the DIU 96 performs the operation using the buses AD_CPU, tRDR, RDW, and D_BUS.

If the DIU 96 is executing another operation, or if DIU 96 receives the accessing request from the CPU 93 and the data read request signal RDR_HDC transferred from the data access request signal generator 923, simultaneously, the DIU 96 performs the data access operation requested by the CPU 93, preferentially. In this case, the data access request signal generator 923 continues the output of the address indicating the register 9 and the data write request signal RDW_HDC during the data access operation based on the request from the CPU 93.

After the completion of the data access operation based on the request by the CPU 93, the DIU 96 outputs the address indicating the register 9 to the data address bus D_AD in response to the request from the data access request signal generator 923 and also outputs the data as the write-in data to the data bus DB.

Figure 6:
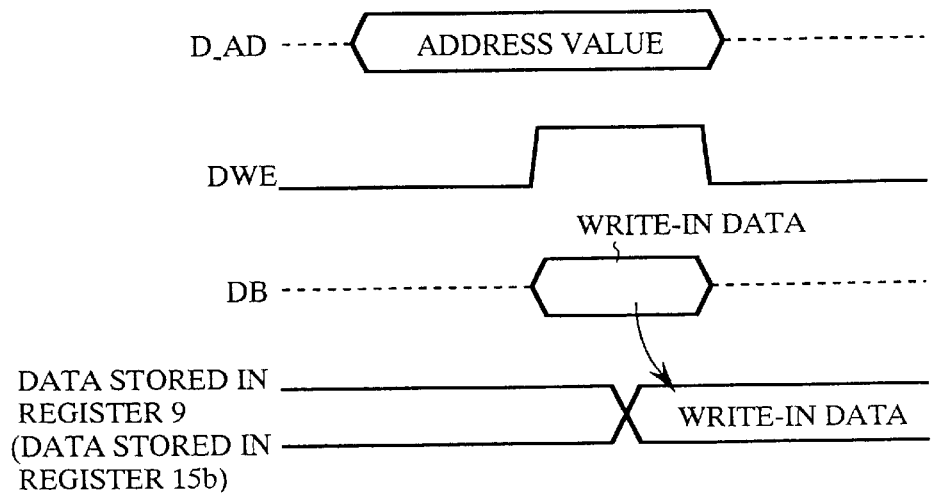
FIG. 6 is a timing chart showing the write-in operation for data.

When receiving the address indicating the register 9 and the data write-in signal DWE, the register 9 inputs the data as the write-in data through the data bus DB and then stored therein (see FIG. 6).

Thereby, the data write-in operation is completed. The DIU 96 acknowledges the completion of the data write-in operation when the data write-in signal DWE has been output to the bus, and the DIU 96 generates and outputs an access completion acknowledge signal HDC_ACK to the data access request signal generator 923.

When receiving the access completion acknowledge signal from the DIU 96, the data access request signal generator 923 knows the completion of the data write operation, and halts the output of both the address indicating the register 9 and the output of the data write request signal RDW_HDC and the write-in data to the bus D_BUS_HDC.

After receiving the data, the data access request signal generator 923 outputs the obtained data to the HDC_CU 910. This means that the HDC_CU 910 has read the data stored in the register 9 in the MPU 91.

The description will be given of the data write-in operation into the register 9 in the MPU 91 by the HDC_CU 910 in the HDC 92. The data write-in operation to the ROM 7, and the SRAM 8 can be executed by the same manner.

First, the HDC_CU 910 outputs the address indicating the register 9 in the MPU 91 and a write request signal and a desired data item to be written into the register 9 to the data interface circuit 911 and the data access request signal generator 923, where the data format to be used for data transfer operation through the bus group 900 and the timing of data transfer through the bus group 900 are the same manner to be used in a normal operation in which the HDC_CU 910 writes data to the memories such as the ROM 13, the SRAM 14, the register 15, and the DRAM 16 in the HDC 92.

When receiving the address indicating the register 9 and the write request signal transferred from the HDC_CU 910, the data access request signal generator 923 decodes the address in order to check whether or not the address indicates a memory field in the memories such as the ROM 7, the SRAM 8, and the register 9 in the MPU 91.

If the address indicates the memory field in one of the memories such as the ROM 7, the SRAM 8, and the register 9 in the MPU 91 as a result of the checking operation of the address by the data access request signal generator 923, and the data access request signal generator 923 enters the operation and the data interface circuit 911 continues a halt of its own operation.

On the other hand, in the case that the address indicates the memory field in the memories such as the ROM 13, the SRAM 14, the register 15, and the DRAM 16 in the HDC 92, the data interface circuit 911 begins its own operation and the data access request signal generator 923 continues a halt of its operation.

when receiving the address indicating the register 9 transferred from the HDC_CU 910, the data access request signal generator 923 outputs the address to the address bus AD_CPU_HDC and the data write request signal RDW_HDC to the DIU 96, simultaneously. Further, the data access request signal generator 923 outputs the data to be written into the register 9 to the bus D_BUS_HDC (that is a bi-directional bus or a two way bus).

When receiving the data write request signal RDW_HDC and the address indicating the register 9 transferred from the data access request signal generator 923, the DIU 96 outputs the address indicating the register 9 to the data address bus D_AD, the data as write-in data to the data bus DB, and the data write request signal DWE (see FIG. 6) unless the DIU 96 performs the operation using the buses AD_CPU, RDR, RDW, and D_BUS.

If the DIU 96 is executing another operation, or if DIU 96 receives the accessing request from the CPU 93 and the data write request signal RDW_HDC transferred from the data access request signal generator 923, simultaneously, the DIU 96 performs the data access operation requested by the CPU 93, preferentially. In this case, the data access request signal generator 923 continues the output of the address indicating the register 9 and the data write request signal RDW_HDC during the data access operation based on the request from the CPU 93.

After the completion of the data access operation based on the request by the CPU 93, the DIU 96 outputs the address indicating the register 9 to the data address bus D_AD in response to the request from the data access request signal generator 923 and also outputs the data as the write-in data to the data bus DB.

When receiving the address indicating the register 9, the data write-in signal DWE, and the write-in data, the register 9 inputs the write-in data through the data bus DB and then stored therein (see FIG. 6). Thereby, the data write-in operation has completed. The DIU 96 acknowledges the completion of the data write-in operation when the data write-in signal DWE has been output to the bus, and the DIU 96 generates and outputs an access completion acknowledge signal HDC_ACK to the data access request signal generator 923.

When receiving the access completion acknowledge signal from the DIU 96, the data access request signal generator 923 knows the completion of the data write operation, and halts the output of both the address indicating the register 9, the output of the data write request signal RDW_HDC, and the write-in data to the bus D_BUS_HDC.

Finally, we wish to emphasize the following points about the features of the present invention:

It is, in general, easy obtained from conventional techniques for the HDC to directly read data stored in the memories in the MPU by incorporating an additional data interface circuit for the memories in the MPU into the HDC. However, this method leads a drawback to increase the entire area of a system LSI including the MPU and the HDC incorporating the additional data interface circuit because the area of the additional data interface circuit is approximately equal to that of the MPU.

On the other hand, in the configuration of the third embodiment according to the present invention shown in FIG. 9, the data access request signal generator 923, that is added into the HDC 92, is smaller in configuration that the DIU 96. Therefore the increasing of the entire area of the system LSI including the MPU 91 and the HDC 92 becomes small.

The reason that the circuit area of the data access request signal generator 923 is small is following:

The buses to be required for data transfer accessing such as an address bus, a data bus, a data write-in request signal bus, a data readout request signal bus are included in the bus group 90 in advance;

The function of the data access request signal generator 923 to be required is only to output data received through the bus group 90 to the DIU 96 without changing the data received and to continue the data output until receiving the access completion acknowledge signal HDC_ACK transferred from the DIU 96. (That is, when comparing the function of the data access request signal generator 923, the DIU 96 must have the function to handle more-complex bus timings for the memory accessing if the DIU 96 has the function of the data access request signal generator 923. In this case, it is required to increase the circuit configuration or size of the DIU 96.)

According to the system LSI of the third embodiment, the HDC 92 can directly access the memories in the MPU 91 only by adding a small circuit in size such as the data access request signal generator 923.

As described above, according to the present invention, because the system LSI including the MPU and the control LSI is so formed that the code interface circuit is incorporated in the control LSI and the code interface circuit decodes addresses transferred from the CPU in the MPU, and fetches and outputs program codes stored in the memories in the control LSI when the addresses indicate memory fields in the memories based on a decoding result, it is possible to read the program codes stored in the memories in the control LSI at a high speed rate.

In addition, according to the present invention, because it is so formed that the code interface circuit in the control LSI incorporates the DRAM control circuit for directly controlling the operation of the DRAM in the control LSI, it is possible to read program codes stored in the DRAM at a high speed rate without incorporating any dedicated circuit.

Furthermore, according to the present invention, it is possible for the control LSI to read data stored in the memories in the MPU because the system LSI is so formed that when the control circuit outputs addresses and the data read access request signal, the access circuit receives and decodes the addresses, and outputs the addresses and the data read access request signal to the data interface circuit when a decoding result of the addresses indicates memory fields in the memories, and the data interface circuit receives the addresses and the data read access request signal transferred from the access circuit, and reads data items from the memories according to the addresses and the data read access request signal, and then outputs the data items read to the access circuit.

Moreover, according to the present invention, it is possible for the control LSI to write data into the memories in the MPU because the system LSI is so formed that when the control circuit outputs addresses, write-in data to be written, and a data write access request signal as the access request signal, the access circuit receives and decodes the addresses, and outputs the addresses, the write-in data, and the data write access request signal to the data interface circuit when a decoding result of the addresses indicates memory fields in the memories, and the data interface circuit receives the addresses, the write-in data, and the data write access request signal transferred from the access circuit, and writes the write-in data to the memories according to the addresses and the data write access request signal.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A LSI system, comprising:
   a MPU comprising:
      a CPU;
      a plurality of first memories; and
      a first code interface circuit for receiving addresses transferred from said CPU, for decoding said addresses and for accessing said first memories when a decoding result indicates said first memories; and
   a control LSI comprising:
      a plurality of second memories; and
      a second code interface circuit for receiving said addresses transferred from said CPU, for decoding said addresses, for accessing said memories when a decoding result of said addresses indicates memory fields in said second memories, for reading program codes stored in said second memories according to said decoding result of said addresses, and for outputting said program codes to said CPU, wherein said code interface circuit comprises a ring buffer to sequentially store said program codes that have been read from said second memories, and said code interface circuit continues a readout operation of said program codes from said second memories unless said ring buffer has empty memory fields.

2. A LSI system as claimed in claim 1, wherein said second memories include a DRAM, and said second code interface circuit in said control LSI comprises a DRAM control circuit to directly access said DRAM.

3. A LSI system comprising:
   a MPU comprising:
      memories; and
      a data interface circuit for performing data accessing to said memories when receiving addresses addressing said memories and a data access request signal; and
   a control LSI directly connected to said MPU, said control LSI comprising:
      a control circuit; and
      an access circuit for receiving addresses and an access request signal transferred from said control circuit, for decoding said addresses, and for outputting to said data interface circuit said addresses and said access request signal when a decoding result of said addresses indicates memory fields in said memories in said MPU,
   wherein said data interface circuit performs a data access operation to said memories according to said addresses and said access request signal transferred from said access circuit, and then transfers data items as an execution result of said data access operation to said access circuit.

4. A LSI system comprising as claimed in claim 3, wherein when said control circuit outputs addresses and a data read access request signal as said access request signal, said access circuit receives and decodes said addresses, and outputs said addresses and said data read access request signal to said data interface circuit when a decoding result of said addresses indicates memory fields in said memories, and wherein said data interface circuit receives said addresses and said data read access request signal transferred from said access circuit, and reads data items from said memories according to said addresses and said data read access request signal, and then outputs said data items read to said access circuit.

5. A LSI system comprising as claimed in claim 3, wherein when said control circuit outputs addresses, write-in data to be written, and a data write access request signal as said access request signal, said access circuit receives and decodes said addresses, and outputs said addresses, said write-in data, and said data write access request signal to said data interface circuit when a decoding result of said addresses indicates memory fields in said memories, and wherein said data interface circuit receives said addresses, said write-in data, and said data write access request signal transferred from said access circuit, and writes said write-in data to said memories according to said addresses and said data write access request signal.

6. A LSI system comprising:
   a MPU comprising:
      memories; and
      a data interface circuit for performing data accessing to said memories when receiving addresses addressing said memories and a data access request signal; and
   a control LSI comprising:
      a control circuit; and
      an access circuit for receiving addresses and an access request signal transferred from said control circuit, for decoding said addresses, and for outputting directly to said data interface circuit said addresses and said access request signal when a decoding result of said addresses indicates memory fields in said memories in said MPU,
   wherein said data interface circuit performs a data access operation to said memories according to said addresses and said access request signal transferred from said access circuit, and then directly transfers data items as an execution result of said data access operation to said access circuit.

* * * * *